(12) United States Patent
Kim

(10) Patent No.: US 6,904,208 B2
(45) Date of Patent: Jun. 7, 2005

(54) OPTICAL POWER SPLITTER WITH ASSISTANCE WAVEGUIDE

(75) Inventor: Heu-Gon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 10/270,762

(22) Filed: Oct. 15, 2002

(65) Prior Publication Data

US 2003/0113066 A1 Jun. 19, 2003

(30) Foreign Application Priority Data

Dec. 17, 2001 (KR) ......................... 2001-79907

(51) Int. Cl.[7] ................................. G02B 6/26
(52) U.S. Cl. ............................. 385/46; 385/45
(58) Field of Search ......................... 385/44–46

(56) References Cited

U.S. PATENT DOCUMENTS

| 5,757,995 A | * | 5/1998 | Chen et al. ............... 385/45 |
| 6,195,482 B1 | * | 2/2001 | Dragone .................... 385/28 |
| 6,714,704 B2 | * | 3/2004 | Lin et al. .................. 385/37 |

FOREIGN PATENT DOCUMENTS

| EP | 0651267 A1 | 10/1994 | ........... G02B/6/125 |
| EP | 0785449 A1 | 7/1997 | ........... G02B/6/28 |
| EP | 0881512 A2 | 12/1998 | ........... G02B/6/34 |
| EP | 1111417 A1 | 6/2001 | ........... G02B/6/293 |

OTHER PUBLICATIONS

"Length Requirements for Power Splitters in Optical Communication Systems;" T. Rasmussen et al.; Electronic Letters, vol. 30, No. 7; Mar. 31, 1994; XP006000370; 2 pages.
"A Low–Loss Y–Branch With a Multimode Waveguide Transition Section;" Quian Wang et al.; IEEE Photonics Technology Letters, vol. 14, No. 8: Aug. 2002; XP001132226; 3 pages.
"Compact 1 × 16 Power Splitter Based on Symmetrical 1 × 2 MMI Splitters;" M. Bouda et al.; Electronics Letters, vol. 30, No. 21; Oct. 31, 1994; XP006001221; 3 pages.

* cited by examiner

Primary Examiner—Akm Enayet Ullah
Assistant Examiner—Jerry T. Rahll
(74) Attorney, Agent, or Firm—Cha & Reiter, L.L.C.

(57) ABSTRACT

Disclosed is an optical power splitter that maximizes uniformity of the power split ratio, while minimizing the output differences between channels. The optical power splitter includes a semiconductor substrate; a core layered on the semiconductor substrate, functioning as a transmission medium for optical signals composed of multi-channels according to a wavelength, wherein the core comprises an input waveguide for receiving the optical signals and a plurality of output waveguides for outputting respective portions of the optical signals whose powers are split; a clad for encompassing the core; and a rectilinear assistant waveguide coupled between the input waveguide and a plurality of output waveguides, having a designated width and length to uniformize mode profiles of the multi-channels that are manifested on the output side edge of the rectilinear assistant waveguide.

9 Claims, 16 Drawing Sheets

OPTICAL POWER SPLITTER WITH ASSISTANCE WAVEGUIDE

CLAIM OF PRIORITY

This application claims priority to an application entitled "OPTICAL POWER SPLITTER WITH ASSISTANCE WAVEGUIDE" filed in the Korean Industrial Property Office on Dec. 17, 2001 and assigned Serial No. 01-79907, the contents of which are hereby incorporated by reference.

BACKGROUND OF THE INVENTION

1. Field of the Invention

The present invention relates generally to a planer lightwave circuit, and in particular, to an optical power splitter.

2. Description of the Related Art

In general, a planar lightwave circuit includes a semiconductor substrate, a core, which is layered on the semiconductor substrate, for propagating inputted optical signals using total internal reflection, and a clad encompassing the core. An optical circuit using such waveguide would also include optical power splitters/combiners for splitting or combining power of optical signal, and wavelength division multiplexers/demultiplexers for multiplexing or demultiplexing channels that compose optical signals according to wavelength. Moreover, the structure of an optical power splitter is largely divided into a two-branch structure, a so-called Y-branch waveguide, and a multi-branch structure, a so-called star coupler.

FIG. 1 diagrammatically illustrates a Y-branch waveguide. The Y-branch waveguide includes an input waveguide 110 whose input edge receives optical signals and whose width is gradually larger from the input edge to an output side edge 115, and a first and a second output waveguides 120 and 130 that are symmetrically extended around a central line 140 from the input waveguide 110 to the output side edge 115. The Y-branch waveguide is a planar lightwave circuit and is formed by layering a core having a high refractive index and clad having a low refractive index to encompass the core upon a semiconductor substrate.

The power of the combined optical signals through the input side edge of the Y-branch waveguide splits and is outputted through the first and the second output waveguides 120 and 130. It is important to make the power of the optical signals outputted from the first and the second output waveguides 120 and 130 equal, that is, to make the power split ratio uniform for the Y-branch waveguide. In addition, the power uniformization is required for optical signals of a single channel as well as optical signals of multi-channels.

FIG. 2a is a diagram illustrating mode profiles of the input waveguide 110 according to a wavelength, on the basis of the output side edge 115 of the input waveguide 110. FIG. 2b is a diagram illustrating mode profiles of the first and the second output waveguides 120 and 130 according to a wavelength on the basis of the output side edge 115 of the input waveguide 110.

Depicted in FIG. 2a are a first mode profile 210 for a first channel, and a second mode profile 220 for a second channel. The first channel has a wavelength of 1250 nm, and the second channel has a wavelength of 1650 nm. As shown in the drawing, the first mode profile 210 for a short wavelength is sharper than the second mode profile 220 for a long wavelength.

Similarly, FIG. 2b shows a third mode profile 230 for the first channel and a fourth mode profile 240 for the second channel. As illustrated in the drawing, the third mode profile 230 for a short wavelength is sharper than the fourth mode profile 240 for a long wavelength.

FIG. 3a is a diagram explaining mode inconsistency of the Y-branch waveguide for the first channel and FIG. 3b is a diagram explaining mode inconsistency of the Y-branch waveguide for the second channel.

Depicted in FIGS. 3a are the first mode profile 210 of the input waveguide 110 for the first channel and the third mode profile 230 of the first and the second output waveguides 120 and 130. As shown in the drawing, the first mode profile 210 and the third mode profile 230 are not consistent with each other. As a result, this mode inconsistency causes the output of the split optical signals to the first and the second output waveguides 120 and 130.

FIG. 3b shows the second mode profile 220 of the input waveguide 110 for the second channel and the fourth mode profile 240 of the first and the second output waveguides 120 and 130. As depicted in the drawing, the second mode profile 220 and the fourth mode profile 240 are not consistent with each other. As a result, this inconsistency causes the output of the split optical signals to the first and the second output waveguides 120 and 130.

As explained above, the outputs of the first and the second output lightwaves 120 and 130 are similar to each other. In particular, the first and the second output lightwaves 120 and 130 in the Y-branch waveguide have a bilaterally symmetrical structure around the central line 140, shown in FIG. 1. This property may be helpful to uniformize the power split ratio, however, the performance of the Y-branch waveguide is deteriorated due to output differences between the first and the second output lightwaves 120 and 130. FIG. 4 is an explanatory diagram of outputs per wavelength in the Y-branch waveguide. FIG. 4 shows output curves 250 per wavelength of the first or second output waveguide 110 or 130. As shown in FIG. 4, the output power decreases as the wavelength increases. Moreover, the variation range A also increases as the wavelength increases.

FIG. 5 is a schematic diagram of a prior art star coupler. The star coupler includes an input waveguide 310 for receiving optical signals through an input side edge, an oval-shaped slab waveguide 320 that is connected to the input waveguide 310, and the first through the fourth output waveguides 330, 340, 350 and 360 that are extended symmetrically around a central line 370 from an output side edge 325 of the slab waveguide 320. Here, the star coupler is a planar lightwave circuit, and is formed by layering a core having a high refractive index and clad having a low refractive index to encompass the core upon a semiconductor substrate.

The combined optical signals through the input side edge of the input waveguide 310 are outputted through the first through the fourth output waveguides 330, 340, 350 and 360 via the slab waveguide 320. It is important to make the power split ratio uniform for the star coupler, thereby allowing the output powers of the optical signals from the first through the fourth output waveguides 330, 340, 350 and 360 to also be uniform. In addition, the power uniformization is required for optical signals of a single channel as well as optical signals of multi-channels.

FIG. 6a is a diagram illustrating mode profiles of the slab waveguide 320 according to a wavelength, based on the output side edge 325 of the slab waveguide 320. FIG. 6b is a diagram illustrating mode profiles of the first through the fourth output waveguides 330, 340, 350 and 360 according to a wavelength, based on the output side edge 325 of the slab waveguide 320.

Depicted in FIG. 6a are a first mode profile 410 for a first channel and a second mode profile 420 for a second channel. The first channel has a wavelength of 1250 nm, and the second channel has a wavelength of 1650 nm. As shown in the drawing, the first mode profile 410 for a shorter wavelength is sharper than the second mode profile 420 for a longer wavelength.

Similarly, FIG. 6b shows a third mode profile 430 for the first channel and a fourth mode profile 440 for the second channel. As illustrated in the drawing, the third mode profile 430 for a shorter wavelength is sharper than the fourth mode profile 440 for a longer wavelength.

FIG. 7a is a diagram explaining mode inconsistency of the star coupler for the first channel and FIG. 7b is a diagram explaining mode inconsistency of the star coupler for the second channel.

Depicted in FIG. 7a is the first mode profile 410 of the slab waveguide 320 for the first channel and the third mode profile 430 of the first through the fourth output waveguides 330, 340, 350 and 360. As shown in the drawing, the first mode profile 410 and the third mode profile 430 are not consistent with each other, and this mode inconsistency causes the split optical signals to be outputted to the first through the fourth output waveguides 330, 340, 350 and 360.

FIG. 7b shows the second mode profile 420 of the slab waveguide 320 for the second channel and the fourth mode profile 440 of the first through the fourth output waveguides 330, 340, 350 and 360. As depicted in the drawing, the second mode profile 420 and the fourth mode profile 440 are not consistent with each other and this inconsistency causes the split optical signals to be outputted to the first through the fourth output waveguides 330, 340, 350 and 360.

As explained above, the outputs of the first and the fourth output waveguides 330 and 360 are similar to each other, and the outputs of the second and the third output waveguides 340 and 350 are similar to each other. Further, the star coupler has a bilaterally symmetrical structure around the central line 370 shown in FIG. 5, and the first and the fourth waveguides 330 and 360 and the second and the third output waveguides 340 and 350, respectively, share similarities with each other.

Therefore, unlike the Y-branch waveguide, the star coupler has known limitations with un-uniform power split ratios and output differences between channels. This inconsistency in the power split ratio and the severe output differences between channels consequently deteriorate the performance of the star coupler.

FIG. 8 is an explanatory diagram of outputs per wavelength of the star coupler. Depicted in the drawing are a first output curve per wavelength 450 of the first or the fourth output waveguide 330 or 360, and a second output curve per wavelength 460 of the second or the third output waveguide 340 or 350. From the drawing it is shown that the output power of the first output curve per wavelength 450 tends to increase for longer wavelengths, while the output power of the second output curve per wavelength 460 tends to decrease for longer wavelengths. Moreover, the entire variation range B of the first and the second output curves per wavelength 450 and 460 is very large.

SUMMARY OF THE INVENTION

The present invention reduces or overcome many of the above limitations by providing an optical power splitter for maximizing uniformization of the power split ratio, while minimizing the output differences between channels.

In accordance with principals of the present invention, an optical power splitter is provided, which includes: a semiconductor substrate, a core on the semiconductor substrate that is used as a transmission medium for optical signals, which are composed of multi-channels according to a wavelength, and a clad for encompassing the core. The core includes an input waveguide for receiving an optical signal and a plurality of output waveguides for outputting respective portions of the optical signal (whose power has been split). The optical power splitter further includes a rectilinear assistant waveguide coupled between the input waveguide and the plurality of output waveguides, having a predetermined width and length that substantially uniforms the mode profiles of the multi-channels (e.g. the respective portions of the optical signal) that are manifested on the output side edge of the rectilinear assistant waveguide, which multichannels are thereafter provided to the plurality of output waveguides.

BRIEF DESCRIPTION OF THE DRAWINGS

The present invention will become more apparent from the following detailed description when taken in conjunction with the accompanying drawings in which.

DETAILED DESCRIPTION OF THE PREFERRED EMBODIMENT

Figure 1:
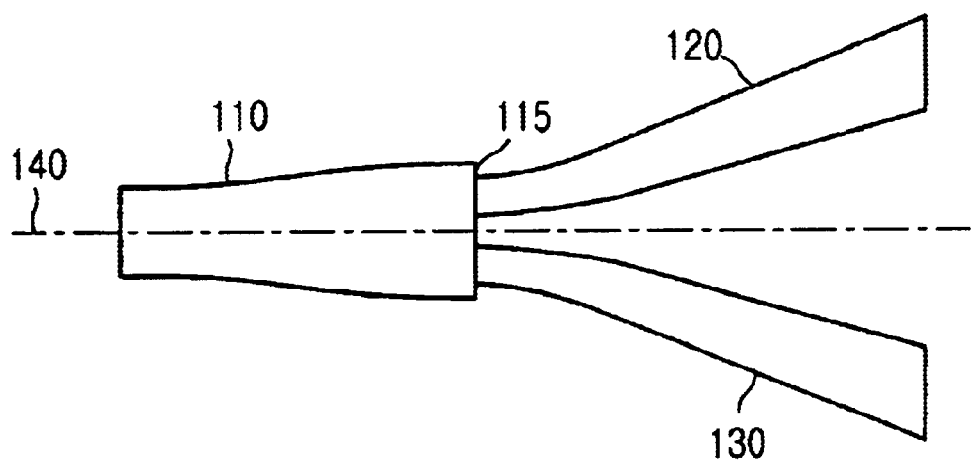
FIG. 1 is a schematic diagram of a prior art Y-branch waveguide.
Figure 2A:
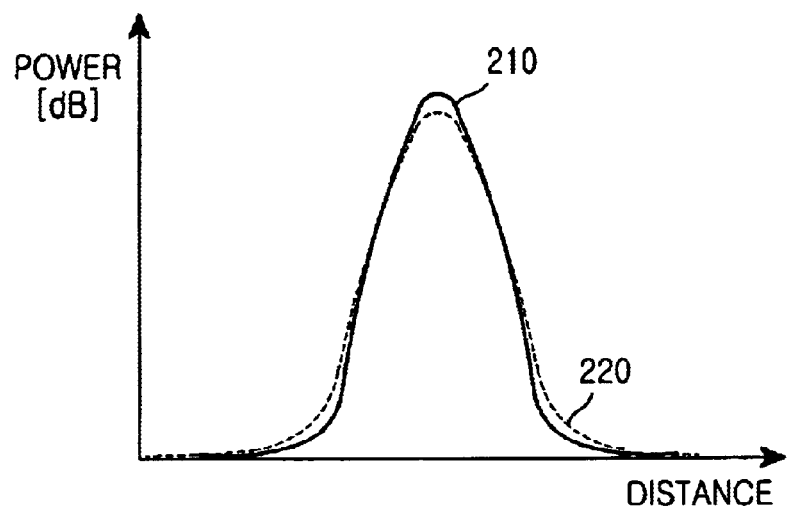
FIGS. 2a through 3b are diagrams of mode inconsistency of the Y-branch waveguide depicted in FIG. 1.
Figure 2B:
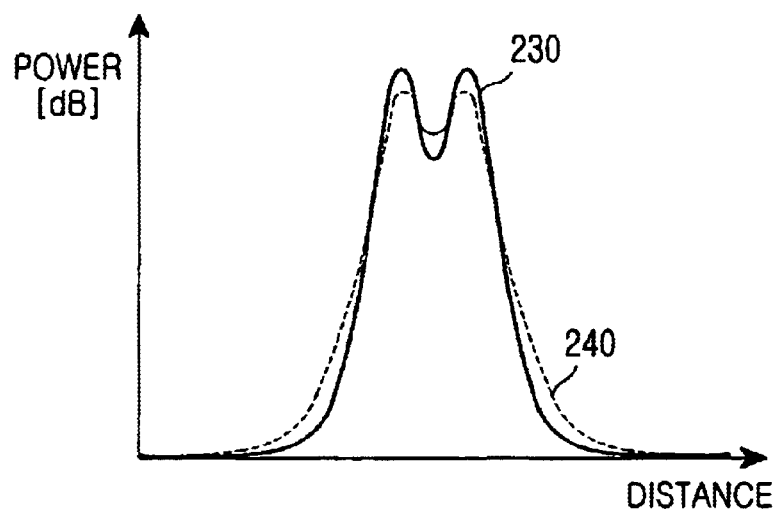
Figure 3A:
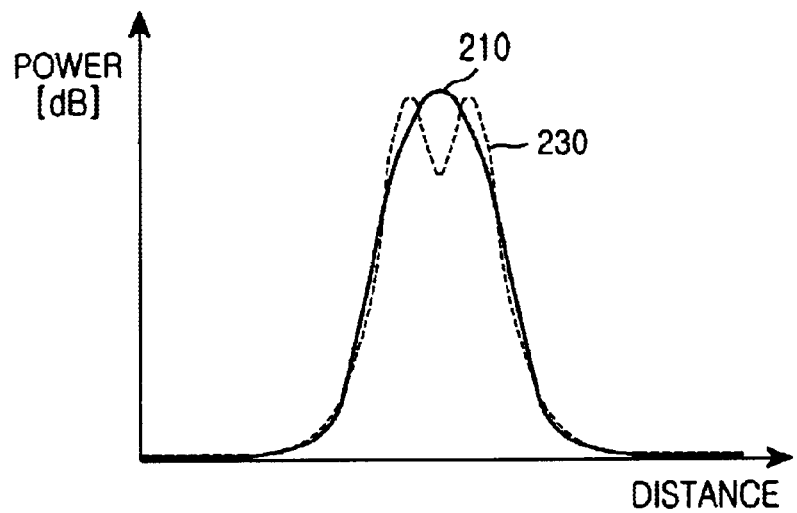
Figure 3B:
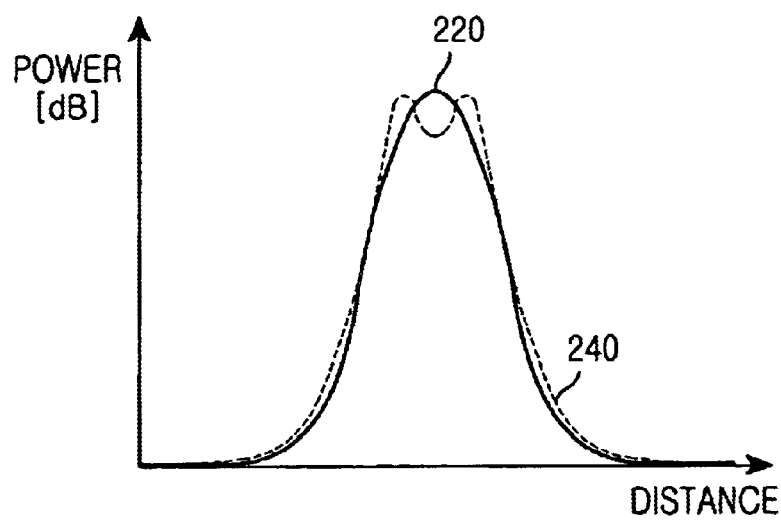
Figure 4:
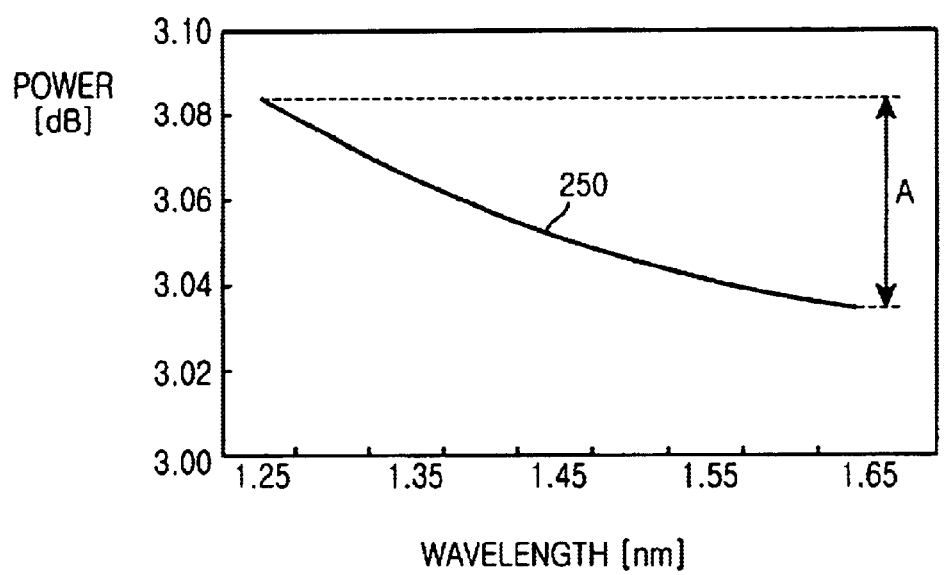
FIG. 4 is a diagram of the output per wavelength of the Y-branch waveguide.

In the following description of the present invention, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. Moreover, it will be recognized that certain aspects of the figures are simplified for explanation purposes and that the full system environment for the invention will comprise many known functions and configurations all of which need not be shown here. In the drawings, the same or similar elements are denoted by the same reference numerals even though they are depicted in different drawings.

Figure 9:
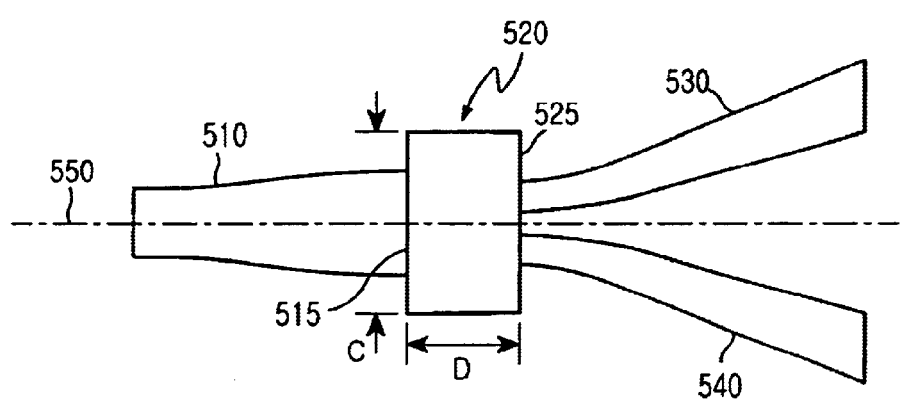
FIG. 9 is a schematic diagram of an optical power splitter in accordance with a preferred embodiment of the present invention.

FIG. 9 is a schematic diagram of an optical power splitter in accordance with a preferred embodiment of the present invention. In this illustrative embodiment, the optical power splitter includes a Y-branch waveguide having an input waveguide 510, an assistant waveguide 520, and a first and a second output waveguide 530 and 540.

The input waveguide 510 receives optical signals through the input side edge and its width gets broader towards output side edge 515.

The assistant waveguide 520 is coupled between the input waveguide 510 and the first and the second output waveguides 530 and 540. The assistant waveguide 520 has a larger width C than the input waveguide 510, and a designated length D.

The first and the second output waveguides 530 and 540 are extended symmetrically around a central line 550 from an output side edge 525 of the assistant waveguide 520.

The Y-branch waveguide is a planar lightwave circuit and is formed by layering a core having a high refractive index and clad having a low refractive index to encompass the core upon a semiconductor substrate.

Importantly, the maximum mode field diameter of optical signals that are combined through the input side edge of the input waveguide 510 is extended while passing the assistant waveguide 520. Moreover, the local mode field diameter and phase of the optical signals are continuously changed along with the longitudinal direction of the assistant waveguide 520. The mode field diameter indicates the width of a mode profile for the optical signal at an arbitrary position on the assistant waveguide 520. Advantageously, the assistant waveguide 520 has a designated length for uniformizing mode profiles based on the output side edge 525. The first and second output waveguides 530 and 540 split the power of the inputted optical signals through the output side edge 525 of the assistant waveguide 520, and output the split optical signals.

Figure 10:
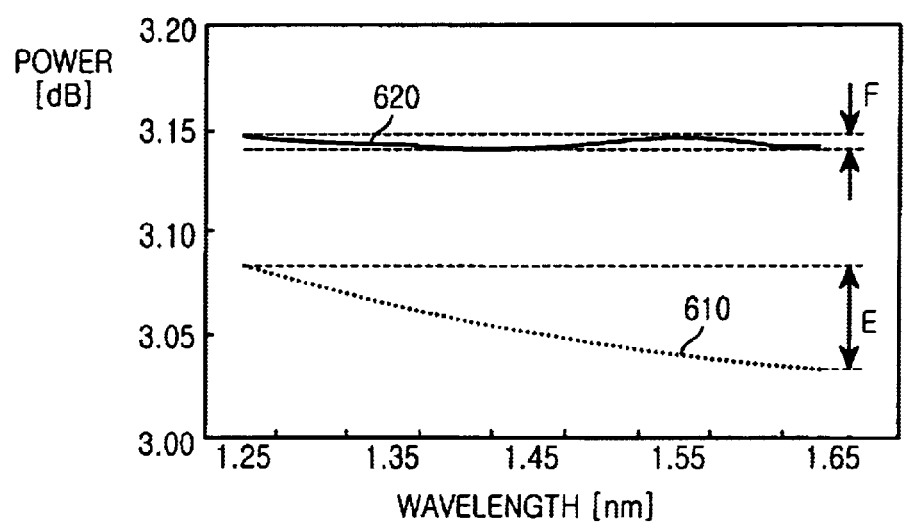
FIG. 10 is a diagram of the output per wavelength of the Y-branch waveguide.

FIG. 10 is a diagram of the output per wavelength of the Y-branch waveguide. Output curve per wavelength 610 is shown for the first or the second output waveguide 530 or 540, where the length of the assistant waveguide 520 is '0'. Output curve per wavelength 620 is shown for the first or the second output waveguides 530 or 540, where the length of the assistant waveguide 520 is 225 $\mu$m. It is noted that the width of the assistant waveguide 520 is 12.5 $\mu$m, and if the length of the assistant waveguide 520 is '0', the Y-branch waveguide has the same structure with that of FIG. 1.

It is also found that the outputs of the first output curve per wavelength 610 gradually decrease towards longer wavelengths, and the variation range E is relatively large. On the other hand, the second output curve per wavelength 620 is uniform, and the variation range F is also relatively small.

Figure 11:
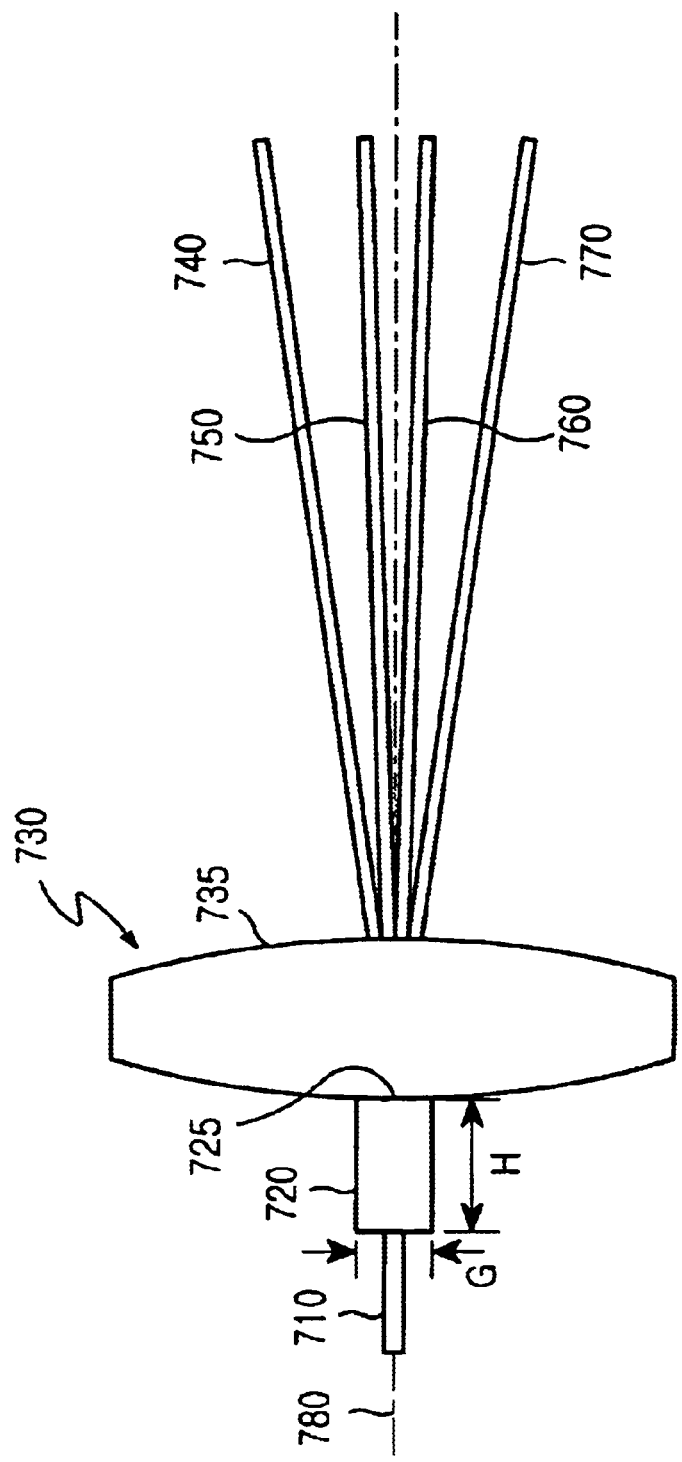
FIG. 11 is a schematic diagram of an optical power splitter in accordance with another embodiment of the present invention.

FIG. 11 is a schematic diagram of an optical power splitter in accordance with another embodiment of the present invention. More specifically, FIG. 11 shows a star coupler, which includes an input waveguide 710 for receiving optical signals through an input side edge, an assistant waveguide 620, an oval-shaped slab waveguide 730 and a first through fourth output waveguides 740, 750, 760 and 770.

The assistant waveguide 720 is coupled between the input waveguide 710 and the first and the slab waveguide 730. The assistant waveguide 720 has a larger width G than the input waveguide 710, and a designated length H.

The oval-shaped slab waveguide 730 is coupled to the assistant waveguide 720 and the first through the fourth output waveguides 740, 750, 760 and 770 are extended symmetrically around a central line 780 from an output side edge 735 of the slab waveguide 730.

The star coupler is a planar lightwave circuit and is formed by layering a core having a high refractive index and clad having a low refractive index to encompass the core upon a semiconductor substrate.

The maximum mode field diameter of optical signals that are combined through the input side edge of the input waveguide 710 is extended while passing the assistant waveguide 720. Also, the local mode field diameter and phase of the optical signals are continuously changed along with the longitudinal direction of the assistant waveguide 720. Advantageously, the assistant waveguide 720 has a designated length for uniformizing mode profiles on the basis of the output side edge 725. Thereafter, the optical signals are outputted through the first through the fourth output waveguides 740, 750, 760 and 770 via the slab waveguide 730.

FIGS. 12 through 15 are diagram of the output changes of the star coupler according to changes in width G or length H of the assistant waveguide depicted 720.

Figure 12:
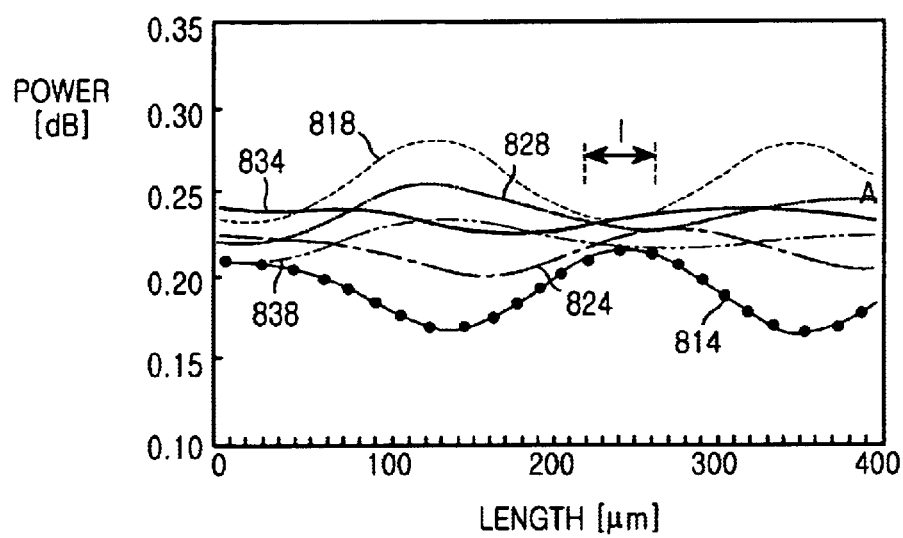
FIGS. 12 through 15 are diagrams of the output changes of the star coupler according to changes in width or length of the assistant waveguide depicted in FIG. 11.

FIG. 12 illustrates a case where the width of the assistant waveguide 720 is 9 $\mu$m. In particular, the drawing shows a first and a second output curves per length 814 and 818 of the first and the second output waveguides 740 and 750 for the first channel, a third and a fourth output curves per length 824 and 828 of the first and the second output waveguides 740 and 750 for the second channel, and a fifth and a sixth output curves per length 834 and 838 of the first and the second output waveguides 740 and 750 for the third channel. The first channel has a wavelength of 1250 nm, the second channel 1450 nm and the third channel 1650 nm. In addition, it is known that the first through the sixth output curves per length 814, 818, 824, 828, 834 and 838 have a designated converging region I.

Figure 13:
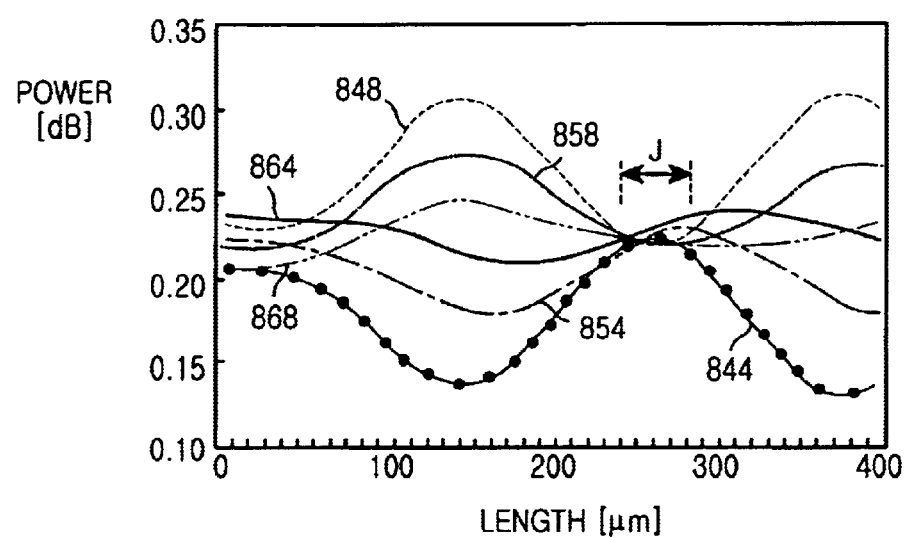

FIG. 13 illustrates a case where the width of the assistant waveguide 720 is 10 $\mu$m. In particular, the drawing shows a first and a second output curves per length 844 and 848 of the first and the second output waveguides 740 and 750 for the first channel, a third and a fourth output curves per length 854 and 858 of the first and the second output waveguides 740 and 750 for the second channel, and a fifth and a sixth output curves per length 864 and 868 of the first and the second output waveguides 740 and 750 for the third channel. The first channel has a wavelength of 1250 nm, the second channel 1450 nm and the third channel 1650 nm. In addition, it is known that the first through the sixth output curves per length 844, 848, 854, 858, 864 and 868 have a designated converging region J.

Figure 14:
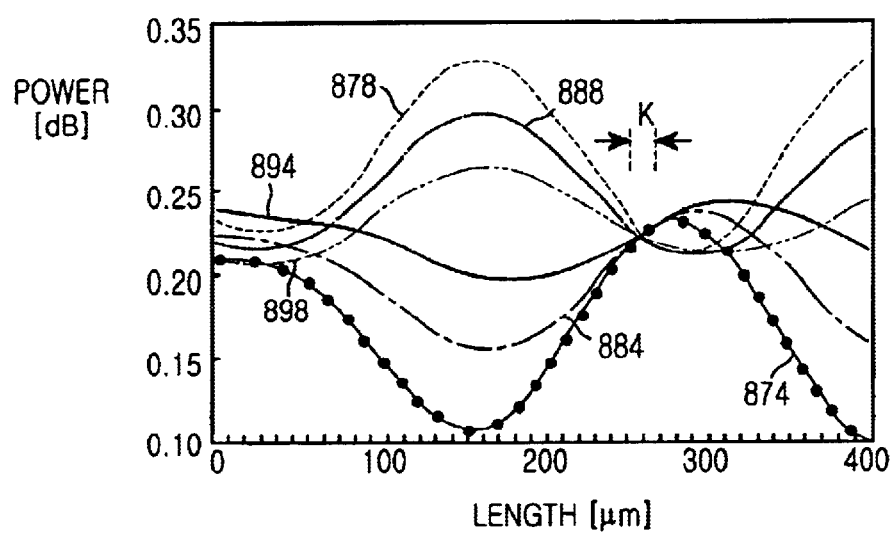

FIG. 14 illustrates a case where the width of the assistant waveguide 720 is 11 $\mu$m. In particular, the drawing shows a first and a second output curves per length 874 and 878 of the first and the second output waveguides 740 and 750 for the first channel, a third and a fourth output curves per length 884 and 888 of the first and the second output waveguides 740 and 750 for the second channel, and a fifth and a sixth output curves per length 894 and 898 of the first and the second output waveguides 740 and 750 for the third channel. The first channel has a wavelength of 1250 nm, the second channel 1450 nm and the third channel 1650 nm. In addition, it is known that the first through the sixth output curves per length 874, 878, 884, 888, 894 and 898 have a designated converging region K.

Figure 15:
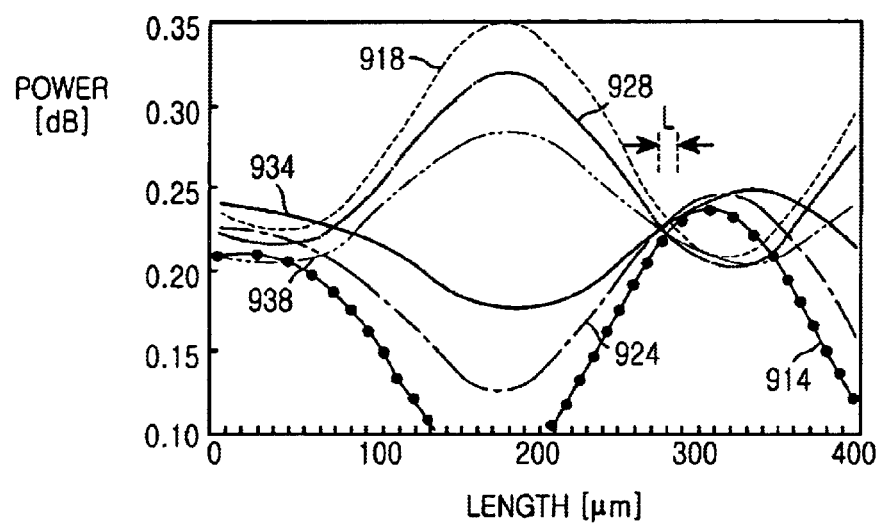

FIG. 15 illustrates a case where the width of the assistant waveguide 720 is 12 $\mu$m. In particular, the drawing shows a first and a second output curves per length 914 and 918 of the first and the second output waveguides 740 and 750 for the first channel, a third and a fourth output curves per length 924 and 928 of the first and the second output waveguides 740 and 750 for the second channel, and a fifth and a sixth output curves per length 934 and 938 of the first and the second output waveguides 740 and 750 for the third channel. The first channel has a wavelength of 1250 nm, the second channel 1450 nm and the third channel 1650 nm. In addition, it is known that the first through the sixth output curves per length 914, 918, 924, 928, 934 and 938 have a designated converging region L.

Advantageously, by selecting an optimal length and width for the assistant waveguide 720, it is possible to maximize uniformization of the power split ratio of the star coupler and to minimize differences in outputs between channels thereof.

Figure 5:
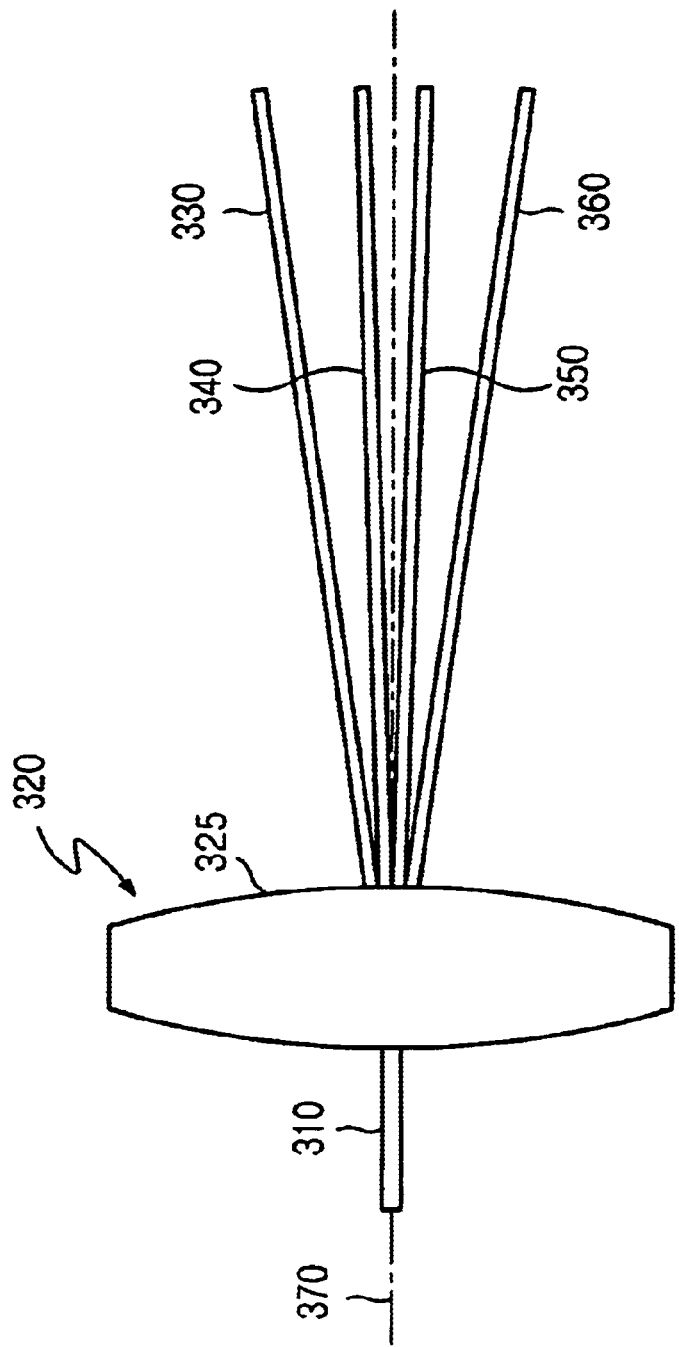
FIG. 5 is a schematic diagram of a prior art star coupler.
Figure 6A:
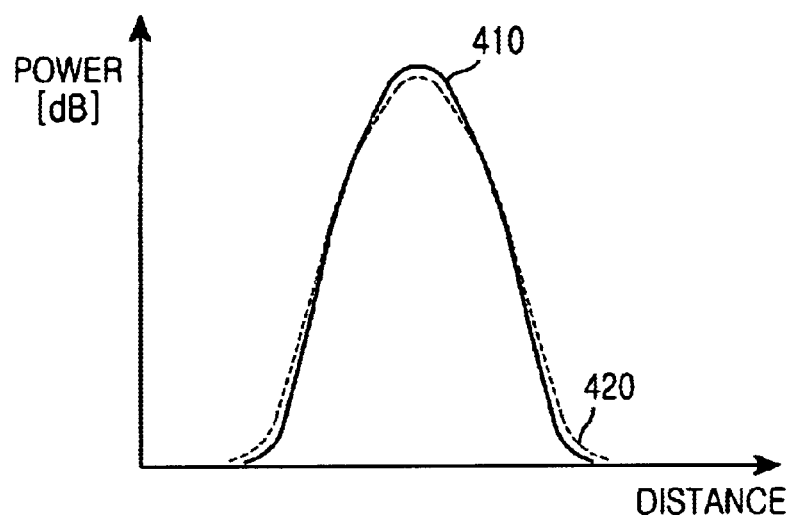
FIGS. 6a through 7b are diagrams of mode inconsistency of the star coupler depicted in FIG. 5.
Figure 6B:
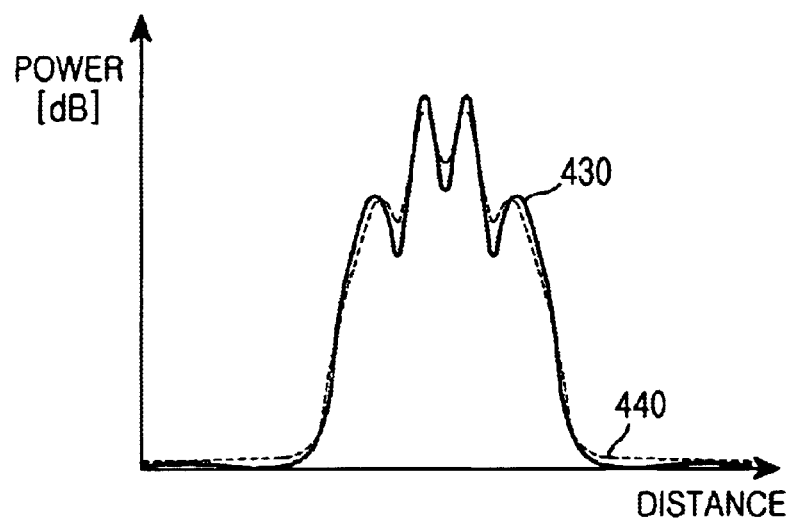
Figure 7A:
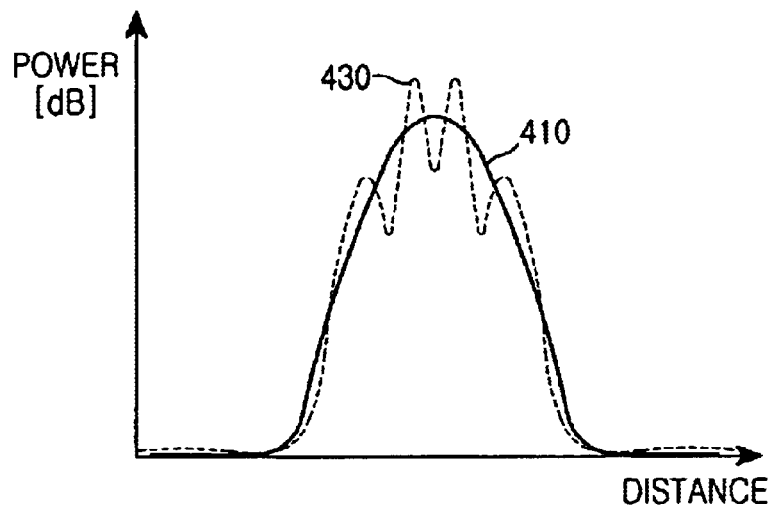
Figure 7B:
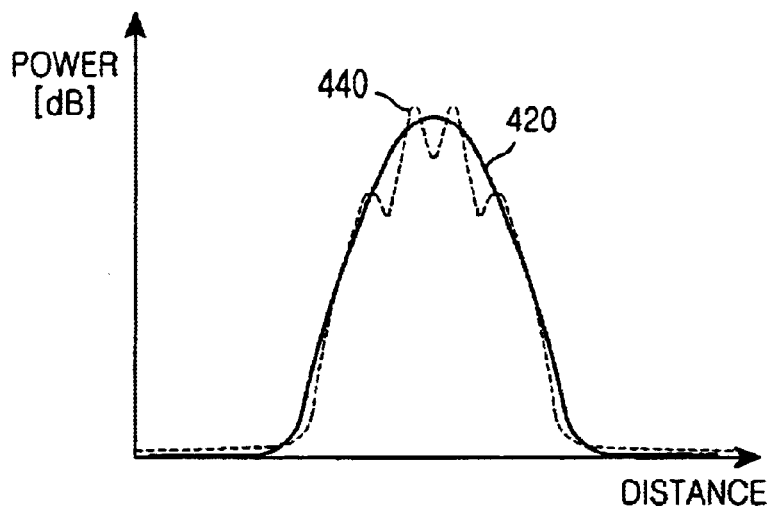
Figure 8:
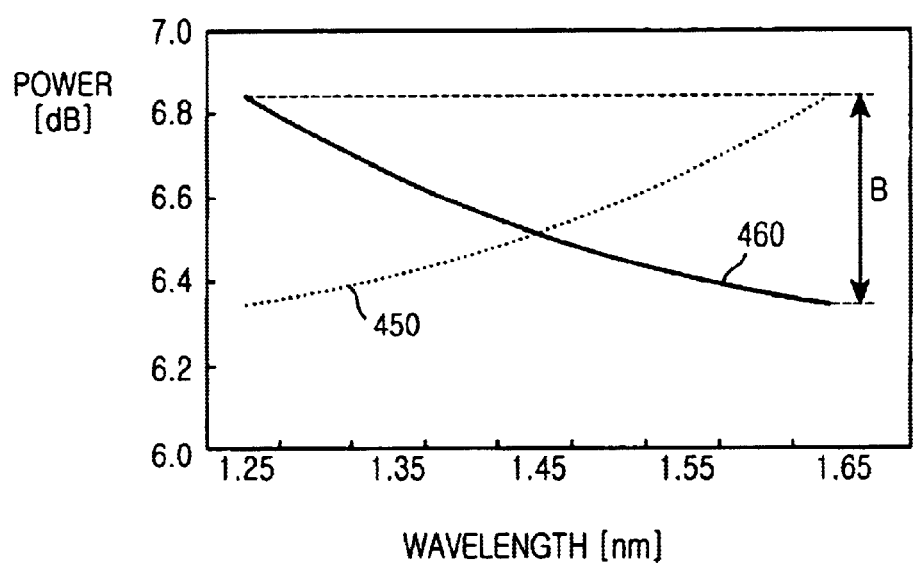
FIG. 8 is a diagram of the output per wavelength of the star coupler.
Figure 16:
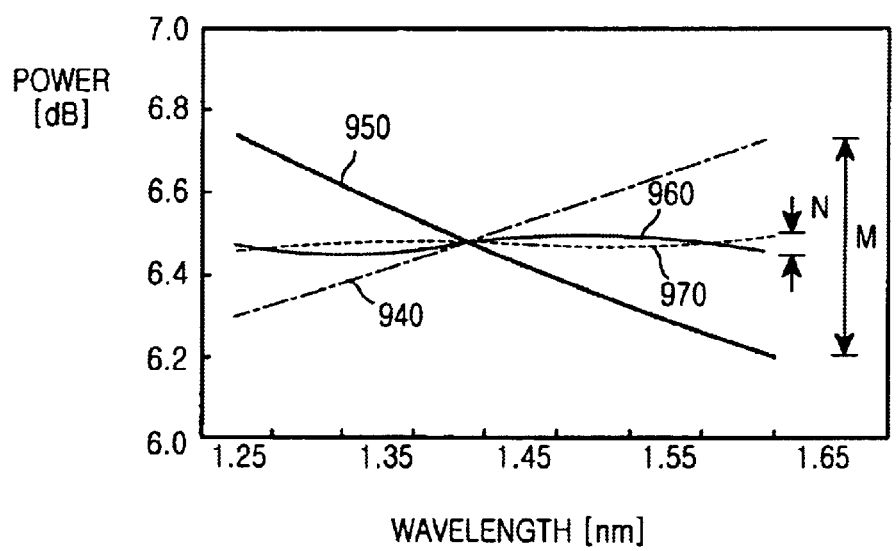
FIG. 16 is a diagram of the output per wavelength of the star coupler.

FIG. 16 is a diagram of the output per wavelength of the star coupler. In particular, FIG. 16 illustrates a first and a second output curves per wavelength 940 and 950 for the first and the second output waveguides 740 and 750 in case the length of the assistant waveguide 720 is 0, and a third and a fourth output curves per wavelength 960 and 970 for the first and the second output waveguides 740 and 750 in case the assistant waveguide 720 has a width of 11 μm and a length of 255 μm. It is noted that when the length of the assistant waveguide 720 is 0, the star coupler has the same structure with that of FIG. 5.

As shown in FIG. 16, the output powers on the first output curve per wavelength 940 tend to increase for longer wavelengths, while the output powers on the second output curve per wavelength 950 tend to decrease for longer wavelengths. On the other hand, the third and the fourth output curves per wavelength 960 and 970 are uniform. Accordingly, it is found that the variation range N of the third and the fourth output curves per wavelength 960 and 970 is relatively small to the variation range M of the first and the second output curves per wavelength 940 and 950.

The optical power splitter mounted with the assistant waveguide, according to the present invention, is beneficial in maximizing the uniformity of the power split ratio and minimizing differences in output between channels by disposing an assistant waveguide having an optimal width and length between an input waveguide and a plurality of output waveguides.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An optical power splitter comprising: an input waveguide for receiving an optical signal; a plurality of output waveguides, including more than two, for outputting respective portions of the optical signal; and a rectilinear assistant waveguide having an input edge coupled to the input waveguide and an output edge coupled to the plurality of output waveguides, wherein the rectilinear assistant waveguide has a predetermined width and length, which substantially enables uniformity in a division of power of said optical signal among said more than two output waveguides.

2. The optical power splitter as claimed in claim 1, wherein the optical power splitter is fabricated on a semiconductor substrate, having a core layered on the semiconductor substrate, functioning as a transmission medium for optical signals.

3. The optical power splitter as claimed in claim 1, wherein the input edge of the assistant waveguide has a width that is larger than the portion of the input waveguide it is coupled to.

4. The optical power splitter as claimed in claim 1 or claim 3, wherein said optical signal has multiple channels according to wavelength and wherein the having of said predetermined width and length substantially enables uniformity across said multiple channels in any change, at said output edge, in power for a channel.

5. An optical power splitter comprising: an input waveguide for receiving optical signals composed of multi-channels, wherein the optical signal are received by an input side edge that has a larger width towards an output side edge; a first and a second output waveguides, which are extended symmetrically around a central line from an output side edge of the input waveguide; and a rectilinear assistant waveguide coupled between the input waveguide and the first and the second output waveguides, having a designated width and length to uniformize mode profiles of the multi-channels that are manifested on the output side edge.

6. The optical power splitter as claimed in claim 5, wherein an input side edge width of the assistant waveguide is larger than the output side edge width of the input waveguide.

7. The optical power splitter with an assistance waveguide as claimed in claim 5 or claim 6, wherein the length of the assistant waveguide is designated to maximize uniformity of mode profiles of the multi-channels that are manifested on an output side edge of the assistant waveguide within a pre-designated width.

8. An optical power splitter, comprising: an input waveguide for receiving optical signals composed of multi-channels according to a wavelength are inputted through an input side edge; an oval-shaped slab waveguide; a plurality of output waveguides, which are extended symmetrically around a central line from an output side edge of the slab waveguide; and a rectilinear assistant waveguide coupled between the input waveguide and the slab waveguide, having a designated length and a larger width than the input waveguide.

9. The optical power splitter of claim 8, wherein the length of the assistant waveguide is designated to maximize uniformity of mode profiles of the multi-channels that are manifested on an output side edge of the assistant waveguide within a pre-designated width.

* * * * *